US009950382B2

(12) United States Patent
Stastny et al.

(10) Patent No.: US 9,950,382 B2
(45) Date of Patent: Apr. 24, 2018

(54) METHOD FOR A FABRICATED HEAT SHIELD WITH RAILS AND STUDS MOUNTED ON THE COLD SIDE OF A COMBUSTOR HEAT SHIELD

(75) Inventors: Honza Stastny, Georgetown (CA); Parthasarathy Sampath, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 1118 days.

(21) Appl. No.: 13/428,376

(22) Filed: Mar. 23, 2012

(65) Prior Publication Data
US 2013/0251513 A1  Sep. 26, 2013

(51) Int. Cl.
| F04D 29/00 | (2006.01) |
| B23K 1/00 | (2006.01) |
| B23K 20/12 | (2006.01) |
| B23K 26/382 | (2014.01) |
| F23R 3/00 | (2006.01) |
| B23K 101/00 | (2006.01) |

(52) U.S. Cl.
CPC ............ *B23K 1/0018* (2013.01); *B23K 20/12* (2013.01); *B23K 20/1295* (2013.01); *B23K 26/382* (2015.10); *B23K 2201/001* (2013.01); *B23P 2700/13* (2013.01); *F04D 29/00* (2013.01); *F05D 2230/54* (2013.01); *F05D 2240/35* (2013.01); *F23R 3/002* (2013.01); *Y10T 29/49229* (2015.01)

(58) Field of Classification Search
CPC ........ F23R 3/002; B23P 15/008; B23P 15/26; B23K 20/12; B23K 20/1295; B23K 20/382; B23K 26/382; B23K 1/0018; Y10T 29/4932; Y10T 29/49323
USPC ........... 60/267, 752–760; 29/889.22, 890.03, 29/527.2
See application file for complete search history.

(56) References Cited

U.S. PATENT DOCUMENTS

| 3,852,870 | A | * | 12/1974 | Elliott | ................... | B21D 28/06 |
| | | | | | | 29/413 |
| 4,210,041 | A | * | 7/1980 | Mitman | ................ | B21D 28/06 |
| | | | | | | 33/11 |
| 4,432,207 | A | * | 2/1984 | Davis, Jr. | ................ | F23R 3/002 |
| | | | | | | 422/179 |
| 4,688,310 | A | * | 8/1987 | Kelm et al. | ................ | 29/889.22 |
| 5,259,725 | A | * | 11/1993 | Hemmelgarn | ........ | F01D 11/005 |
| | | | | | | 29/450 |
| 5,265,409 | A | | 11/1993 | Smith, Jr. et al. | | |
| 5,799,491 | A | * | 9/1998 | Bell et al. | ...................... | 60/752 |
| 5,822,853 | A | * | 10/1998 | Ritter et al. | ................ | 29/890.01 |
| 6,000,908 | A | * | 12/1999 | Bunker | ........................... | 416/95 |
| 6,207,299 | B1 | * | 3/2001 | Krauth | ..................... | C23C 2/12 |
| | | | | | | 428/653 |
| 6,463,992 | B1 | * | 10/2002 | Dowhan | ................ | C23C 16/01 |
| | | | | | | 164/131 |

(Continued)

Primary Examiner — Lorne Meade
Assistant Examiner — Eric Linderman
(74) Attorney, Agent, or Firm — Norton Rose Fulbright Canada LLP

(57) ABSTRACT

A multi-pieces gas turbine engine combustor heat shield is fabricated from sheet metal. The fabrication involves: sheet metal forming a base sheet having opposed hot and cold facing sides, providing cold side details separately from the base sheet, and mounting the cold side details to the cold facing side of the base sheet. The cold side details may be brazed to the base sheet.

16 Claims, 4 Drawing Sheets

(56) References Cited

U.S. PATENT DOCUMENTS

| | | | |
|---|---|---|---|
| 6,497,105 B1* | 12/2002 | Stastny | 60/796 |
| 7,000,397 B2 | 2/2006 | Pidcock et al. | |
| 7,017,334 B2* | 3/2006 | Mayer et al. | 60/266 |
| 7,059,440 B1* | 6/2006 | Berg | B62M 27/02 |
| | | | 180/186 |
| 7,097,432 B1* | 8/2006 | Lombard | F01D 17/143 |
| | | | 415/157 |
| 7,140,185 B2* | 11/2006 | Burd | 60/752 |
| 7,334,984 B1* | 2/2008 | Stine et al. | 415/173.1 |
| 7,665,307 B2 | 2/2010 | Burd et al. | |
| 8,266,914 B2* | 9/2012 | Hawie et al. | 60/800 |
| 8,418,470 B2* | 4/2013 | Burd | 60/756 |
| 2002/0056277 A1* | 5/2002 | Parry | 60/752 |
| 2002/0116929 A1* | 8/2002 | Snyder | 60/740 |
| 2002/0174658 A1* | 11/2002 | Monty et al. | 60/752 |
| 2002/0182058 A1* | 12/2002 | Darnell | F01D 9/065 |
| | | | 415/115 |
| 2003/0196305 A1* | 10/2003 | Kebbede et al. | 29/402.11 |
| 2003/0213250 A1* | 11/2003 | Pacheco-Tougas et al. | 60/752 |
| 2004/0107574 A1* | 6/2004 | Moertle et al. | 29/890.01 |
| 2004/0217768 A1* | 11/2004 | Kister | G01R 1/07357 |
| | | | 324/754.07 |
| 2005/0086940 A1* | 4/2005 | Coughlan et al. | 60/752 |
| 2006/0021219 A1* | 2/2006 | Caldwell et al. | 29/889.1 |
| 2007/0144178 A1* | 6/2007 | Burd et al. | 60/753 |
| 2008/0072599 A1* | 3/2008 | Morenko | F02C 3/145 |
| | | | 60/734 |
| 2009/0000303 A1 | 1/2009 | Patel et al. | |
| 2009/0021019 A1* | 1/2009 | Thomsen | E04H 12/085 |
| | | | 290/55 |
| 2009/0031639 A1* | 2/2009 | Cortina/Cordero | E04H 12/12 |
| | | | 52/40 |
| 2009/0178383 A1* | 7/2009 | Murphy et al. | 60/39.5 |
| 2010/0095525 A1* | 4/2010 | Shaw | B23P 6/002 |
| | | | 29/888.021 |
| 2010/0095679 A1* | 4/2010 | Rudrapatna et al. | 60/752 |
| 2010/0095680 A1* | 4/2010 | Rudrapatna et al. | 60/754 |
| 2010/0162715 A1* | 7/2010 | Nagaraj et al. | 60/752 |
| 2010/0213645 A1 | 8/2010 | Grote et al. | |
| 2010/0229618 A1* | 9/2010 | Gekht | B21D 53/92 |
| | | | 72/379.2 |
| 2010/0319276 A1* | 12/2010 | Kryger | E04H 12/085 |
| | | | 52/173.1 |
| 2011/0081237 A1* | 4/2011 | Durocher | F01D 9/06 |
| | | | 415/173.1 |
| 2011/0126543 A1* | 6/2011 | Kirsopp et al. | 60/742 |
| 2012/0168108 A1* | 7/2012 | Farris | B22C 9/108 |
| | | | 164/15 |
| 2013/0192255 A1* | 8/2013 | Hunt et al. | 60/796 |
| 2013/0247575 A1* | 9/2013 | Patel | F02C 7/24 |
| | | | 60/752 |
| 2013/0259664 A1* | 10/2013 | Denis | B23K 31/02 |
| | | | 415/182.1 |
| 2017/0122292 A1* | 5/2017 | Michel | F03D 13/20 |

* cited by examiner

METHOD FOR A FABRICATED HEAT SHIELD WITH RAILS AND STUDS MOUNTED ON THE COLD SIDE OF A COMBUSTOR HEAT SHIELD

TECHNICAL FIELD

The application relates generally to gas turbine engines and, more particularly, to combustor heat shields.

BACKGROUND OF THE ART

Combustor heat shields are typically cast from high temperature resistant materials. The casting process is known to be relatively expensive. Furthermore, the casting materials used for combustor heat shield applications may require pack coating for improved oxidation resistance, which adds to the manufacturing costs.

Also, such heat shields are typically produced as a one piece casting, with studs and rails in place. When effusion holes are drilled into the heat shields, special care must be taken to avoid striking the rails and other heat shield details.

Accordingly, it is desirable to have an alternate heat shield construction.

SUMMARY

In one aspect, there is provided a method of manufacturing a combustor heat shield adapted to be mounted to a combustor shell of a gas turbine engine, the method comprising: sheet metal forming a base sheet having opposed hot and cold facing sides, the base sheet being configured to be mounted to an inner surface of the combustor shell; providing cold side details separately from said base sheet, and mounting the cold side details to said cold facing side of the base sheet, the cold side details including rails and studs separately formed and joined to the cold facing side of the base sheet.

In a second aspect, there is provided a gas turbine engine combustor heat shield assembly adapted to be mounted to an inner surface of a combustor shell, the combustor heat shield assembly comprising: an arcuate sheet metal base having opposed cold and hot facing sides, the cold facing side being configured to be mounted in opposed facing relationship with the inner surface of the combustor shell, separate sheet metal rails brazed or welded to the cold facing side of the sheet metal base, the sheet metal base and the sheet metal rails being made from different gauges of sheet metal material and/or from different sheet metal materials, and studs separately joined to the sheet metal base and projecting from the cold facing side of the sheet metal base.

In a third aspect, there is provided a method of fabricating a combustor heat shield adapted to be mounted to an inner surface of a combustor shell, comprising separately forming hot and cold side combustor heat shield details, the hot side detail including an arcuate base sheet configured to cover a segment of a full circumference of the combustor shell, the cold side details including at least a rail configured to define a perimeter along a cold facing side of the arcuate base sheet, the base sheet and the rail being respectively stamped and cut from different gauge of sheet metal material and/or different sheet metal materials; brazing the rail to the cold facing side of the base sheet; and welding studs to the cold facing side of the base sheet within the perimeter defined by the rail.

DESCRIPTION OF THE DRAWINGS

Reference is now made to the accompanying figures, in which.

DETAILED DESCRIPTION OF THE PREFERRED EMBODIMENTS

Figure 1:
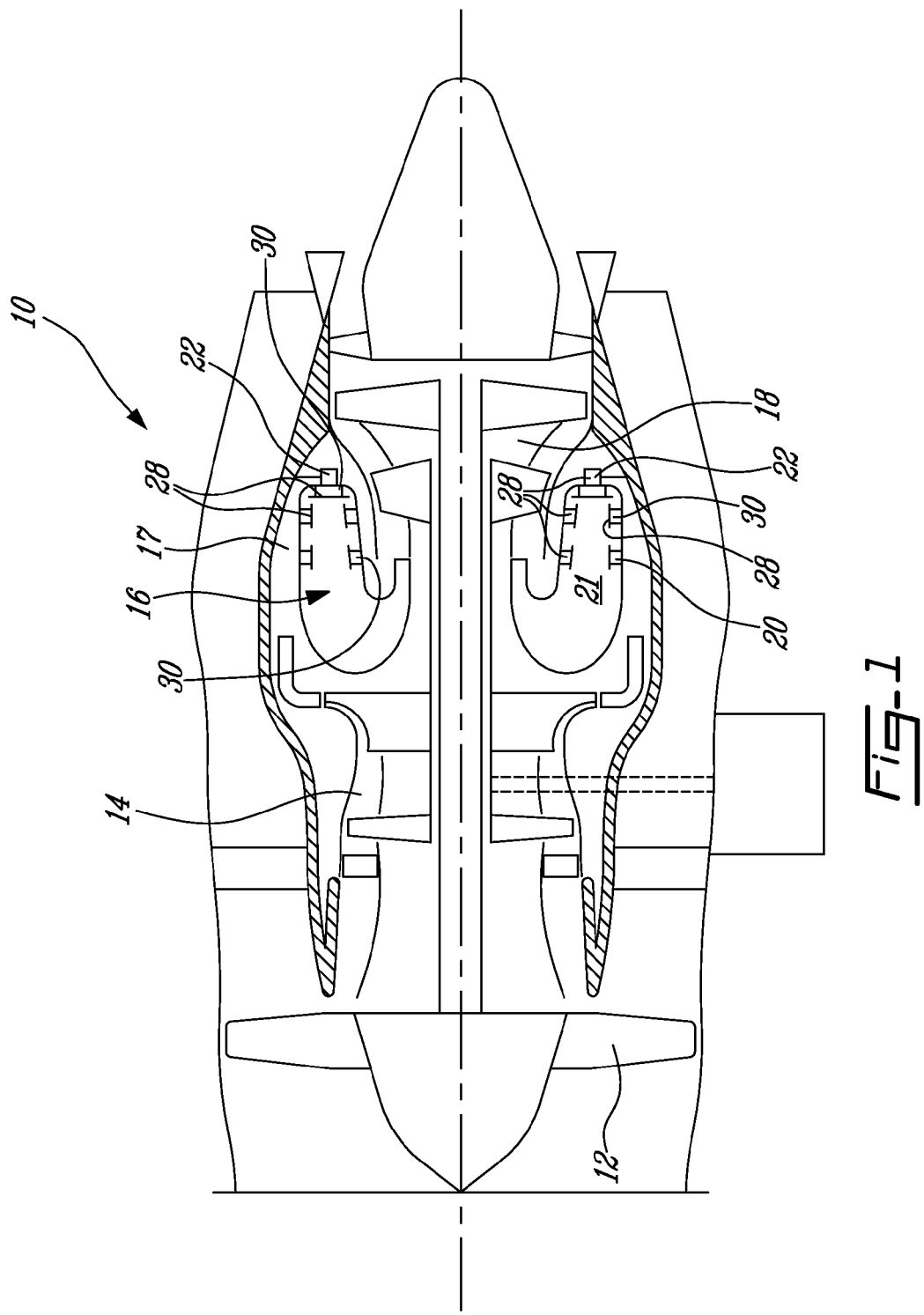
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor 14. The combustor 16 typically comprises a combustion shell 20 defining a combustion chamber 21 and a plurality of fuel nozzles (only two being shown at 22), which are typically equally circumferentially distributed on the dome end panel of the combustor shell 20 in order to permit a substantially uniform temperature distribution in the combustion chamber 21 to be maintained. The combustion shell 20 is typically made out from sheet metal. In use, fuel provided by a fuel manifold (not shown) is atomized by the fuel nozzles 22 into the combustion chamber 21 for ignition therein, and the expanding gases caused by the fuel ignition drive the turbine 18 in a manner well known in the art.

Annular rows of circumferentially segmented heat shields 28 are mounted to the inner surface of the combustor shell 20 to thermally shield the same. Each row of heat shields 28 may cover the full circumference of the combustor shell 20. As shown in FIG. 1, some of the heat shields 28 may be mounted to the dome panel of the combustor shell 20 and others to the axially projecting portions of the combustor shell 20. Depending on the intended application, the heat shields 28 may fully cover the inner surface of the combustor shell 20 from the dome end to the opposed discharged end of the combustor. Alternatively, the heat shields may be only provided on specific portions, such as the dome end wall, of the shell 20.

The heat shields 28 have cold side surfaces or back surfaces which are spaced from the inner surface of the combustor shell 20 to define a back cooling space 30 such that cooling air may circulate therethrough to cool the heat shields 28. Holes are typically defined in the shell 20 to allow cooling air to flow from the plenum 17 to the back cooling space 30 between the heat shields 28 and the combustor shell 20.

Figure 2:
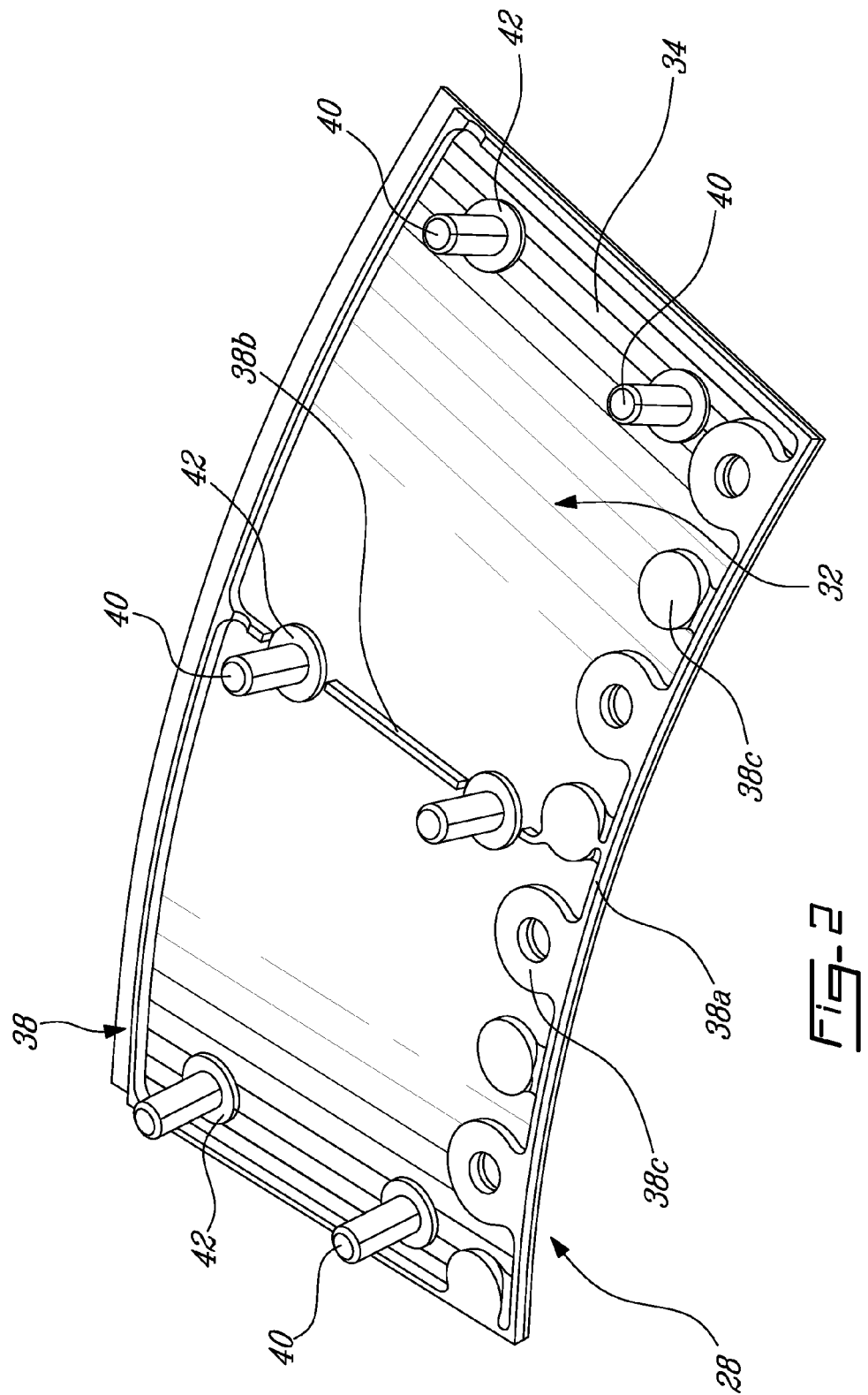
FIG. 2 is an isometric back view of a fabricated heat shield, the effusion holes defined in the base sheet of the heat shield being omitted.
Figure 3:
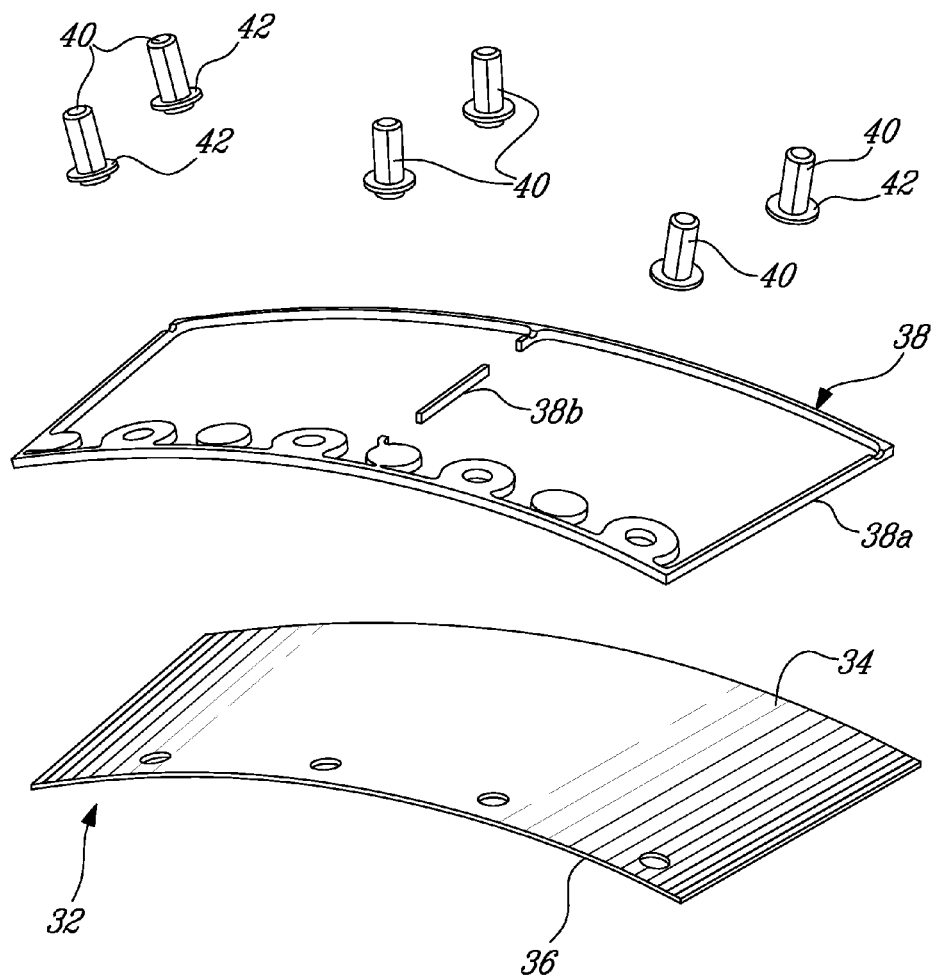
FIG. 3 is an exploded isometric back view illustrating the separate parts forming the heat shield shown in FIG. 2.

FIGS. 2 and 3 show an exemplary construction of one of the combustor heat shields 28. As will be seen hereinafter, the heat shield 28 may be formed from separate sheet metal parts brazed or welded together. Such a sheet metal construction allows reducing the manufacturing costs when compared to conventional one-piece heat shield castings. For instance, the heat shield 28 may comprise a sheet metal base plate 32 having opposed cold and hot facing sides 34 and 36, and cold side details formed separately from the base sheet 32 and then mounted to the cold facing side 34 of the base sheet 32. The cold side details may include heat exchange promoting structures, rails, bosses, divider walls, ribs, pin fins etc. According to the illustrated embodiment, the cold side details include a rail arrangement 38 and threaded studs 40.

The base sheet 32 may be stamped or cut from a wide variety of high temperature resistant sheet metal materials. For illustration purposes only, the base sheet 32 may be made from a 0.035 inches thick sheet of Haynes 188 material. Materials such as Inco625 or SST347 could be used as well if the thermal and vibratory stresses and creep resistance are acceptable for the intended application. A thermal barrier coating, such as a ceramic coating (TBC), may be applied to the hot facing side 36 of the base sheet 32. Holes, such as effusion holes 33 (see FIG. 4) and dilution holes, may be drilled, such as by laser drilling, into the base sheet 32. The effusion holes 33 allow the cooling air to flow from the back cooling space 30 to the front or hot facing side 36 of the heat shields 28.

The rail arrangement 38 may be made from a different sheet metal material than the base sheet 32. According to one embodiment, the rail arrangement 38 is cut in a 0.065 thick sheet of Inco625. However, it is understood that other high temperature resistant materials could be used as well. For instance, the rail arrangement 38 could be made from a sheet of SST3 material. The material may be cut and bent to the required shape. According to the illustrated embodiment, the rail arrangement 38 comprises a peripheral rail 38a defining an enclosed perimeter generally corresponding and adapted to be received within the surface area of the cold facing side of the base sheet 32. The exemplary rail arrangement 38 also comprises a central rail segment 38b extending perpendicularly between the longitudinal sides of the peripheral rail 38a. The central rail segment 38b divides the cold side surface of the base sheet 32 which is enclosed by the peripheral rail 38a into two equal cold side sections. Bosses or similar projecting structures 38c may also integrally extend inwardly from the peripheral rail 38a, as for instance from the bottom longitudinal rail segment thereof.

The rail arrangement 38 may be brazed to the cold facing side of the base sheet 32 using high temperature braze, such as AMS4777 filler. The braze not only bonds the rail arrangement 30 to the base sheet 32, but also provides a conductive heat transfer path between them. The braze process is controlled to minimize voids and ensure proper braze coverage/interface between the parts and thus provides an appropriate heat transfer path. According to one embodiment, the braze joint has a braze coverage of at least about 80%.

Figure 4:
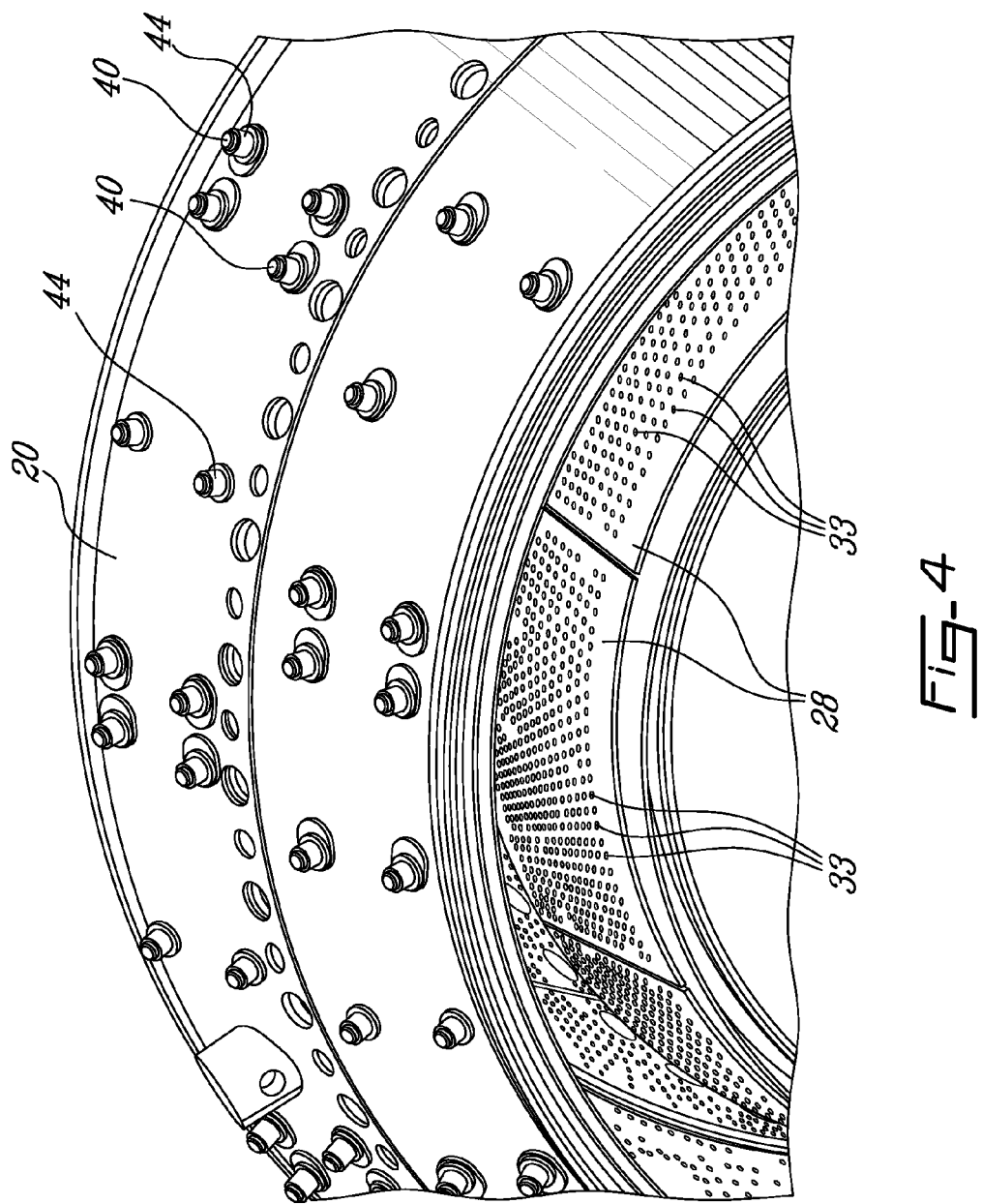
FIG. 4 is an isometric view illustrating the mounting of fabricated heat shields to the shell of the gas turbine engine combustor.

The threaded studs 40 may be welded to the cold facing side 34 of the base sheet 32 by capacitor-discharge welding or other suitable weld or braze processes. The studs 40 may have a machined ring or flange 42 at a proximal end portion. As shown in FIG. 4, the studs 40 protrude through holes defined in the shell 20. Self-locking nuts 44 are threadably engaged on the studs 42 from outside of the combustor shell 20 for retaining the heat shields 28 thereon. The flanges 42 on the studs 40 act as a bearing surface for the nuts 44, and are spaced on stud 40 to have their bearing surface at the same height, or slightly below the height of the rail arrangement 38

The heat shields 28 may be individually fabricated or, alternatively, a circumferentially continuous heat shield ring may be fabricated and subsequently segmented. For instance, it is herein contemplated to form the base sheet 32 into a one-piece annular member or ring, to mount the cold side details to the one-piece annular member before or after drilling the effusion holes therein and to then cut the one-piece annular member into individual circumferential segments. The thermal barrier coating on the hot facing side of the heat shields may also be applied prior to the one-piece annular member being segmented. This may contribute to generally simplify the manufacturing process of the heat shields, thereby further reducing the manufacturing costs as compared to conventional heat shield castings.

According to one possible manufacturing process, a base sheet is provided in the form of a one-piece frusto-conical sheet metal member adapted to be mounted to the inner surface of a combustor shell. If a weld is required to form the frusto-conical member, the weld line is positioned to correspond to a location where the conical member will be subsequently cut to form the individual segments. Then, the studs 40 may be friction welded onto the cold facing side of the frusto-conical member. Next, the hot side of the frusto-conical member can be coated with a thermal barrier material. After coating, the effusion holes may be all laser drilled in one set-up on a laser machine. This allows drilling using a drilling-on-the-fly method. Since the rail arrangement is not yet installed on the cold side of the frusto-conical sheet metal member, the position of the effusion holes can be freely selected without the constraints generally imposed by the presence of integrally cast rails. Because the studs do not have load bearing pins around them but only a circular flange, the laser drilling operation may be simplified, as the laser is free to strike the sheet 32 very close to the studs (on conventional cast heat shields with bearing pins strikes are not allowed at the base of the bearing pins because of the risk of the pins being damaged and separating in service). Thereafter, a separately obtained sheet metal rail arrangement may be brazed to the cold facing side of the frusto-conical sheet metal member. Because the frusto-conical member is still a one-piece annular member, it provides increased stiffness to ease tack welding and braze application, while allowing for brazing of all parts in a same operation. After the brazing operation, dilution holes may be laser drilled into the frusto-conical member. Finally, the frusto-conical member with the studs and the rail arrangements mounted thereto can be laser split into individual heat shields. Since the weld line was initially positioned on a split line, to lie between two heat shield segments, it is removed during the segmenting operation.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A method of manufacturing combustor heat shields adapted to be mounted to a combustor shell of a gas turbine engine, the method comprising:
 a first step of sheet metal forming a base sheet from a one-piece sheet of metal, wherein the first step of sheet metal forming comprises forming the one-piece sheet of metal into a one-piece frusto-conical sheet metal member, the base sheet having opposed hot and cold facing sides, the base sheet being configured to be mounted to an inner surface of the combustor shell;
 then a second step of mounting cold side details to said cold facing side of the base sheet, the cold side details including rails and studs; and a third step of circumferentially segmenting the one-piece frusto-conical sheet metal member into individual combustor heat shields after the second step.

2. The method of claim 1, further comprising applying a thermal protection to the hot facing side of the base sheet.

3. The method of claim 1, wherein mounting involves brazing the rails to the base sheet.

4. The method of claim 3, wherein the braze joint between the rails and the base sheet has a minimal coverage of 80%.

5. The method of claim 4, wherein the studs are welded to the base sheet.

6. The method of claim 2, further comprising drilling cooling holes into the base sheet prior to mounting the cold side details to the base sheet but after applying the thermal protection.

7. The method of claim 2, wherein applying a thermal protection comprises coating the hot facing side of the base sheet with a thermal barrier coating.

8. The method of claim 1, wherein the method comprises cutting the rails from sheet metal material, and brazing the rails along a perimeter of the base sheet.

9. The method of claim 1, wherein the method comprises providing the studs with a flange at a proximal end portion thereof.

10. The method of claim 9, wherein providing the studs with the flange comprises machining a ring at a predetermined location on each of the studs.

11. The method of claim 1, wherein the rails and the base sheet are made from different gauges of sheet metal material and/or from different sheet metal materials.

12. The method of claim 10, wherein the ring is machined such that its height after mounting the studs to the base sheet is same, or slightly below a cold side rail height.

13. A method as defined in claim 1, wherein the one-piece sheet of metal is selected from a group of material comprising: Haynes 188, Inco 625 and SST 347.

14. A method as defined in claim 1, further comprising laser drilling cooling holes into the one-piece frusto-conical sheet metal member prior to segmenting.

15. A method as defined in claim 1, wherein forming the one-piece sheet of metal into a one-piece frusto-conical sheet metal member comprises welding opposed ends of the one-piece sheet of metal together along a weld line, and wherein segmenting comprises cutting along the weld line.

16. A method of fabricating a combustor heat shield adapted to be mounted to an inner surface of a combustor shell, comprising:
 a first step of separately forming hot and cold side combustor heat shield details, the hot side detail including an arcuate base sheet configured to cover a segment of a full circumference of the combustor shell, the cold side details including at least a peripheral rail defining a closed perimeter along a cold facing side of the arcuate base sheet, the base sheet and the peripheral rail being respectively stamped and cut from different gauge of sheet metal material and/or different sheet metal materials;
 a second step of brazing the peripheral rail to the cold facing side of the base sheet and welding studs to the cold facing side of the base sheet within the perimeter defined by the peripheral rail, wherein separately forming hot and cold side combustor heat shield details comprises bending a sheet metal strip into a one-piece frusto-conical member; and
 a third step of cutting the arcuate base sheet in the frusto-conical member after the second step.

* * * * *